United States Patent
Shioya et al.

(10) Patent No.: US 7,295,396 B2
(45) Date of Patent: Nov. 13, 2007

(54) MAGNETIC DISK DRIVE

(75) Inventors: Akio Shioya, Kannami (JP); Akira Kojima, Odawara (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 358 days.

(21) Appl. No.: 10/877,157

(22) Filed: Jun. 24, 2004

(65) Prior Publication Data

US 2004/0264035 A1    Dec. 30, 2004

(30) Foreign Application Priority Data

Jun. 25, 2003    (JP)    ............... 2003-180420

(51) Int. Cl.
    *G11B 5/596*    (2006.01)
(52) U.S. Cl. .................. 360/78.04; 360/78.08
(58) Field of Classification Search ............... None
    See application file for complete search history.

(56) References Cited

U.S. PATENT DOCUMENTS

| 5,570,332 A | * | 10/1996 | Heath et al. | ............... 369/30.1 |
| 6,515,819 B1 | * | 2/2003 | Schmidt et al. | .......... 360/78.04 |
| 6,604,178 B1 | * | 8/2003 | Hall | ............................. 711/167 |
| 6,744,703 B2 | * | 6/2004 | Saito et al. | ............... 369/30.18 |
| 6,850,386 B2 | * | 2/2005 | Kovinskaya et al. | ..... 360/78.06 |
| 2002/0131195 A1 | * | 9/2002 | Dehnert | ................... 360/78.07 |
| 2004/0088478 A1 | * | 5/2004 | Hall | ............................. 711/112 |

FOREIGN PATENT DOCUMENTS

| JP | 2001014111 | 1/2001 |
| JP | 2001222380 | 8/2001 |

\* cited by examiner

*Primary Examiner*—William R. Korzuch
*Assistant Examiner*—Daniell L. Negrón
(74) *Attorney, Agent, or Firm*—Townsend and Townsend and Crew LLP

(57) ABSTRACT

Embodiments of the present invention reduce noise and residual vibration during random access operation of a magnetic disk drive. The magnetic disk drive which executes each instruction from an upper device to move a magnetic head from a start track to an end track on a magnetic disk. In one embodiment, the magnetic disk comprises a processor configured, if a seek span from the start track to the end track, according to a seeking instruction from the upper device, is equal to a preset specific length, to store the seeking instruction for the specific length in memory, and to seek an alternative position from the start track for moving the magnetic head and then seek the end track specified in the stored seeking instruction from the alternative position for moving the magnetic head.

4 Claims, 6 Drawing Sheets

Seek Instruction Sequence Sent from I/F Control Section

Actual Seek Instruction Sequence Executed by Microprocessor

MAGNETIC DISK DRIVE

CROSS-REFERENCES TO RELATED APPLICATIONS

This application claims priority from Japanese Patent Application No. 2003-180420, filed Jun. 25, 2003, the entire disclosure of which is incorporated herein by reference.

BACKGROUND OF THE INVENTION

This invention relates generally to magnetic disk drives and, more particularly, to suppressing seek noise and mechanical residual vibration in magnetic disk devices by eliminating certain seek spans.

Recently, there is an increasing demand for quieter magnetic disk drives in addition to conventional demands for lower price, higher storage capacity, higher access speed, and higher reliability. It is therefore desirable to reduce noise, residual vibration, and the like during random access operation. Conventionally, noise during random access operation is suppressed by such methods as thickening the cover of the magnetic disk drive and adding sound absorbing material. Meanwhile, a method for raising access speed is proposed in Japanese Patent Laid-Open No. 2001-14111. In this method, before tagged random access commands are executed, the command execution order is rearranged so as to more efficiently execute the tagged commands.

In addition, Japanese Patent Laid-Open No. 11-96700 describes a technique in which execution of a large-span seek operation is inserted to prevent external force from fluctuating when short-span seek operations are successively executed (FIG. 1).

In a magnetic disk drive according to the above-mentioned patent, before tagged random access commands are executed, the command execution order is optimized or rearranged so as to more efficiently execute the tagged commands. However, although this may bring about improvement in access performance, there is a possibility that specific seek spans corresponding to characteristic frequencies of the magnetic disk drive may induce resonance phenomena, resulting in such problems as increased operation noise and deteriorated positioning accuracy of the magnetic head due to residual mechanical vibration.

BRIEF SUMMARY OF THE INVENTION

Embodiments of the present invention provide a high access speed magnetic disk drive by solving the above-mentioned problems so as to suppress operation noise and residual mechanical vibration without deterioration in performance.

In specific embodiments of the magnetic disk drive, if an access pattern commanded by an upper device corresponds to a characteristic frequency of the magnetic disk drive, this command is temporally stored (stocked) in a memory and executed after execution of the subsequent command so as to prevent execution of access patterns which correspond to characteristic frequencies of the magnetic disk drive. It is therefore possible to raise the access speed without deteriorating the tagged command executing performance.

An aspect of the present invention is directed to a magnetic disk drive which executes each instruction from an upper device to move a magnetic head from a start track to an end track on a magnetic disk. The magnetic disk comprises a processor configured, if a seek span from the start track to the end track, according to a seeking instruction from the upper device, is equal to a preset specific length, to store the seeking instruction for the specific length in memory, and to seek an alternative position from the start track for moving the magnetic head and then seek the end track specified in the stored seeking instruction from the alternative position for moving the magnetic head.

In some embodiments, the alternative position is determined by a combination of the stored seeking instruction and a subsequent seeking instruction which is received by the magnetic disk drive after the stored seeking instruction. In some other embodiments, the alternative position is disposed between the start track and the end track of the stored seeking instruction. A distance from the start track to the alternative position is shorter than a length between the start track to the end track, and a distance from the alternative position to the end track is shorter than the length between the start back to the end track. A carrier is configured to move the magnetic head from the start track to the alternative position and then from the alternative position to the end track of the stored seeking instruction.

Another aspect of the invention is directed to a magnetic disk drive which executes each instruction from an upper device to move a magnetic head from a start track to an end track on a magnetic disk. The magnetic disk drive comprises a processor configured, if a seek span from the start track to the end track, according to a seeking instruction from the upper device, is equal to a preset specific length stored in memory, to store the seeking instruction for the specific length in memory, and to seek an alternative position from the start track for moving the magnetic head from the start track to the alternative position. The alternative position is determined by a combination of the stored seeking instruction and a subsequent seeking instruction which is received by the magnetic disk drive after the stored seeking instruction.

Yet another aspect of the invention is directed to a magnetic disk drive which executes each instruction from an upper device to move a magnetic head from a start track to an end track on a magnetic disk. The magnetic disk comprises a processor configured, if a seek span from the start track to the end track, according to a seeking instruction from the upper device, is equal to a preset specific length, to execute the seeking instruction as a sequence of two or more seek operations each of which spans a distance shorter than the specific length.

DETAILED DESCRIPTION OF THE INVENTION

Figure 1:
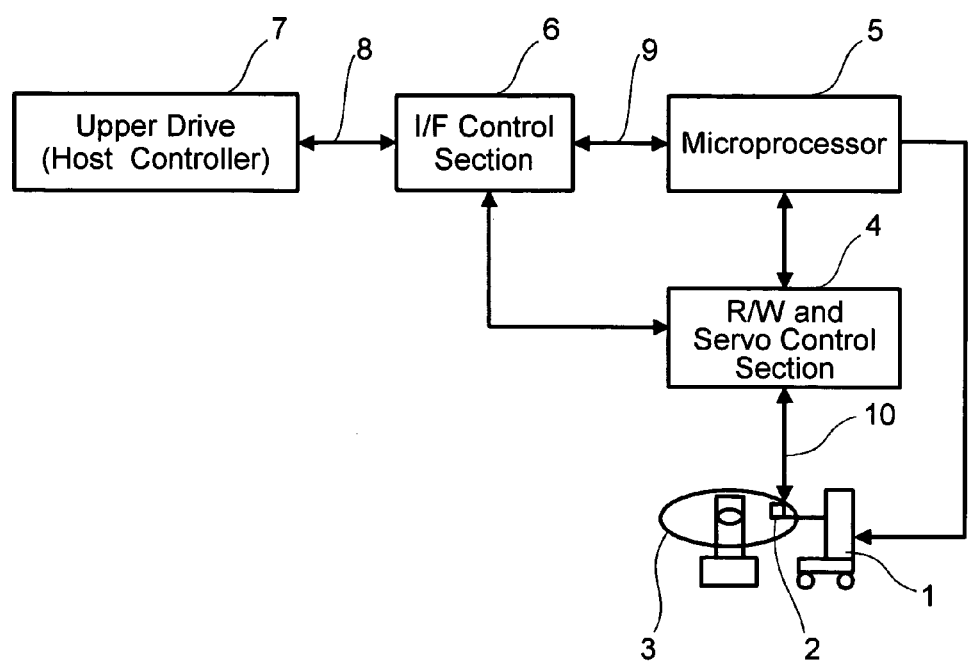
FIG. 1 is a block diagram of an apparatus for executing commands in a magnetic disk drive according to an embodiment of the present invention.
Figure 2:
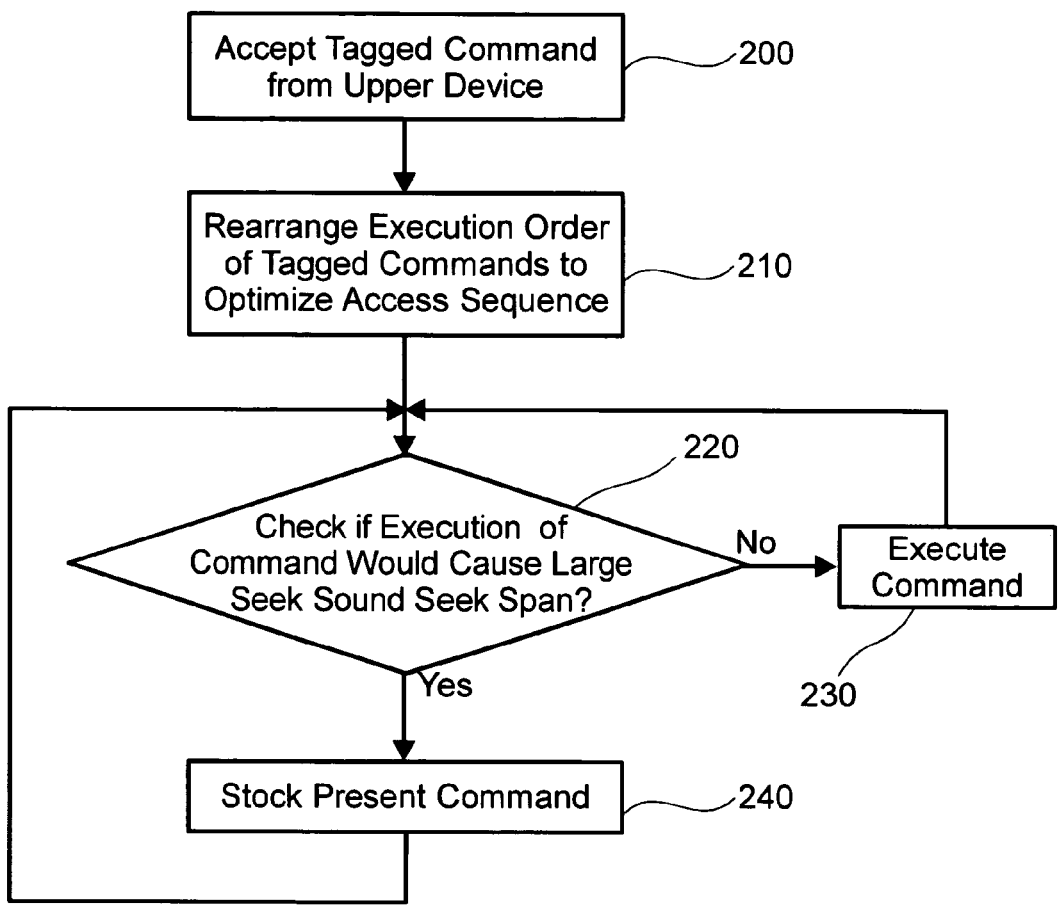
FIG. 2 is a flowchart illustrating how commands are executed in a magnetic disk drive according to an embodiment of the present invention.

FIG. 1 is a block diagram of an apparatus for executing commands in a magnetic disk drive according to one embodiment of the present invention. FIG. 2 is a flowchart illustrating how commands are executed in the magnetic disk drive according to the embodiment.

As shown in FIG. 1, if tagged commands 8 are successively issued to an I/F control section in the magnetic disk drive of this embodiment from an upper device (host controller) 7, the I/F control section 6 optimizes the execution order of the received commands by rearranging them before sending a seek instruction 9 to a microprocessor 5. Then, the microprocessor 5 judges whether the received seek instruction 9 would cause a large seek sound seek span. If the seek span is not such a large seek sound seek span, a carriage 1 is controlled so as to directly execute the received seek instruction 9 to read data by a data read head 2 from a data-recorded magnetic disk 3. Then, the analog data 10 read by the head 2 is sent to a R/W and servo control section 4 which in turn converts the received analog data 10 to digital data and sends the digital data to the I/F control section 6. The I/F control section 6 sends the data to the upper device (host controller) 7 to complete processing of one command.

If the seek span is judged as such a large seek sound seek span, the microprocessor 5 internally stocks the received seek instruction 9 for a time and receives the next seek instruction 9 from the I/F control section 6 to judge whether the received seek instruction 9 would cause a large seek sound seek span. If the seek span is not such a large seek sound seek span, the microprocessor 5 executes the received seek instruction 9 and then the previous seek instruction 9 stocked in the microprocessor 5. That is, if a random access instruction would cause a large seek sound seek span, the seek instruction is stocked for a time while the next seek instruction is executed so as to avoid large seek sound seeks. This can suppress noise in the magnetic disk drive during random access operation.

As used herein, "large residual vibration" and "large seek sound" respectively mean a residual vibration level and a seek sound level which are higher than their prescribed reference levels or fall in their prescribed ranges. In addition, "seek span" used in judging whether to stock instructions is a prescribed length or a prescribed range of lengths.

The magnetic disk drive configured in this manner is controlled as shown in FIG. 2. This control process may be implemented by a computer program which is stored in a computer readable medium and executed by a computer processor.

Firstly, the magnetic disk drive accepts tagged commands from the upper device (step 200). Then, the I/F control section 6 rearranges the execution order of the tagged commands so as to optimize the access sequence (step 210). Then, the microprocessor 5 checks if the command to be executed would causes a large seek sound seek span (step 220). If the seek span by the command to be executed is not judged as a large seek sound seek span, the command is executed (step 230). If the seek span by the command to be executed is judged as a large seek sound seek span, the command is stocked for a time (step 240) in order to suppress seek noise by avoiding the occurrence of the large seek sound seek span.

It is possible to have a plurality of commands stocked. In this case, the magnetic disk drive is configured in such a manner that execution of a plurality of stocked seek instructions is done under queuing control and before each seek instruction picked up from the queue is executed, the seek instruction goes through the step 220 judgment again.

Figure 4:
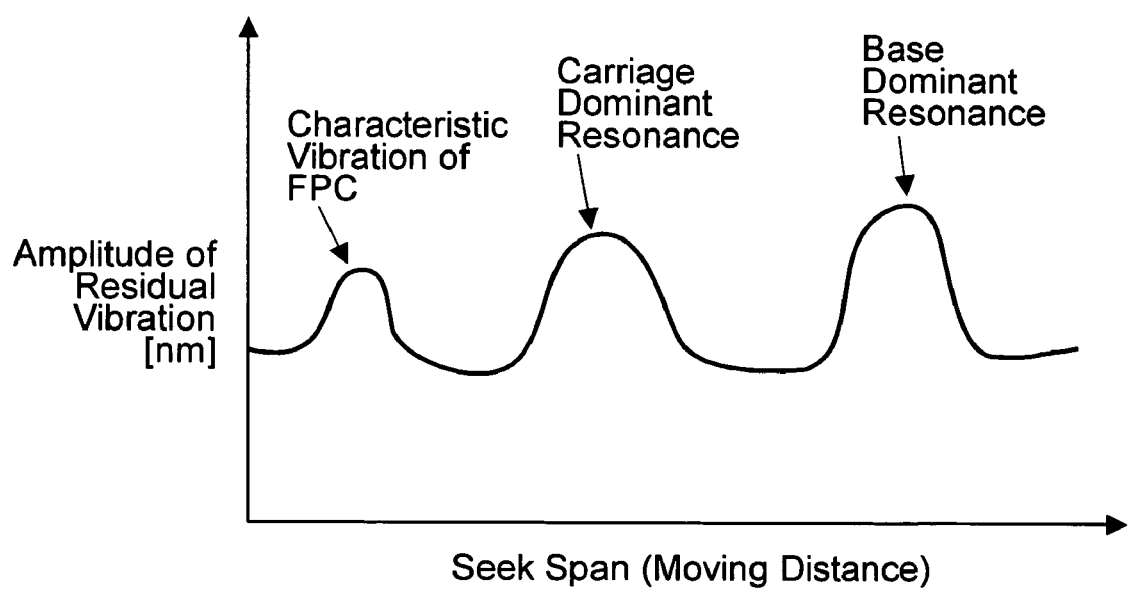
FIG. 4 is a graph showing a relationship between the seek span (moving distance) and the amplitude of residual vibration.

FIG. 4 shows a typical relationship between the seek span (moving distance) and the amplitude of residual vibration. As shown, the amplitude of residual vibration becomes larger where the seek span corresponds to the characteristic frequencies of the mechanical system. The mechanical system has not only one frequency but a plurality of characteristic frequencies and they vary depending on the model. For example, each of the mechanical elements, such as a FCC (Flexible Printed Circuit) board, carriage and base, has a characteristic frequency and behaves as a main source of resonance. In this embodiment, therefore, the relationship between the seek span (moving distance) and the amplitude of residual vibration, unique to the model of the magnetic disk drive, is measured in advance. Each "seek span (moving distance)" which caused "large residual vibration" is stored in a memory of the magnetic disk drive. By using the stored relational data, each "seek span" which would cause a high level of residual vibration can be prescribed (as a seek span to be used in judging whether to stock instructions) in advance so as to suppress vibration while the magnetic disk is being used.

Figure 5:
FIG. 5 is a graph showing a relationship between the seek span (moving distance) and the noise level.

In addition, FIG. 5 shows a typical relationship between the seek span (moving distance) and the noise level. Although the noise is the largest when the seek span is a third of the full stroke as shown, this value varies depending on the model of the magnetic disk drive. In this embodiment, therefore, the relationship between the seek span (moving distance) and the level of noise, unique to the model of the magnetic disk drive, is measured in advance. Each "seek span (moving distance)" which caused "large seek sound" is stored in a memory of the magnetic disk drive. By using the stored relational data, each "seek span" which would cause a high level of noise can be prescribed (as a seek span to be used in judging whether to stock instructions) in advance so as to suppress seek noise while the magnetic disk is being used. Further, by taking both each "seek span (moving distance)" which caused "large seek sound" and each aforementioned "seek span (moving distance)" which caused "large residual vibration" into consideration, each "seek span" which would cause both a high level of residual vibration and a high level of noise can be prescribed as a seek span used in judging whether to stock instructions as well.

Figure 3:
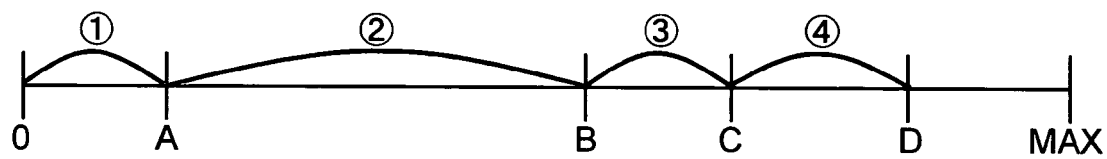
FIG. 3 is a diagram illustrating how seek instructions are executed during random access operation in accordance with a specific example of the present invention.
Figure 3:
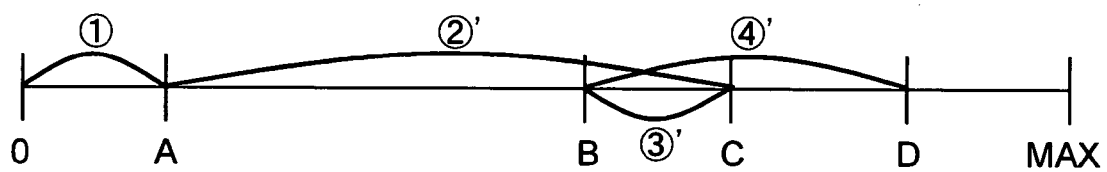

Then, the following describes a specific example illustrating the application of the above-mentioned random access scheme with reference to FIG. 3. The I/F control section 6 rearranges the execution order of tagged random access commands. As a result in this example, since the microprocessor 5 is given a seek instruction sequence to seek for positions A, B, C and D in this order from position 0, the successive instructions sent from the I/F control section 6 have seek spans ①, ②, ③, and ④ respectively. If the seek span or moving distance ② from position A to position B corresponds to a characteristic frequency of the magnetic disk drive and would cause larger operation noise and residual vibration, the microprocessor 5 stocks the A-to-B seek instruction therein and executes the C-sought instruction. After the C-sought instruction is executed, the microprocessor executes the B-sought instruction stocked therein. Then, after the B-sought instruction is executed, the microprocessor 5 executes the D-sought instruction. Therefore, positions A, B, C, and D are actually sought from the position 0 in the order of A, C, B and D by the seek instructions executed by the microprocessor. In this case, seek spans ①, ②', ③' and ④' occur in this order. Since none of these seek spans equal the seek span ② which corresponds to a characteristic frequency of the magnetic disk drive, this seek span sequence suppresses the seek noise and mechanical residual vibration, making it possible to realize low noise and high accuracy positioning operation.

Figure 6:
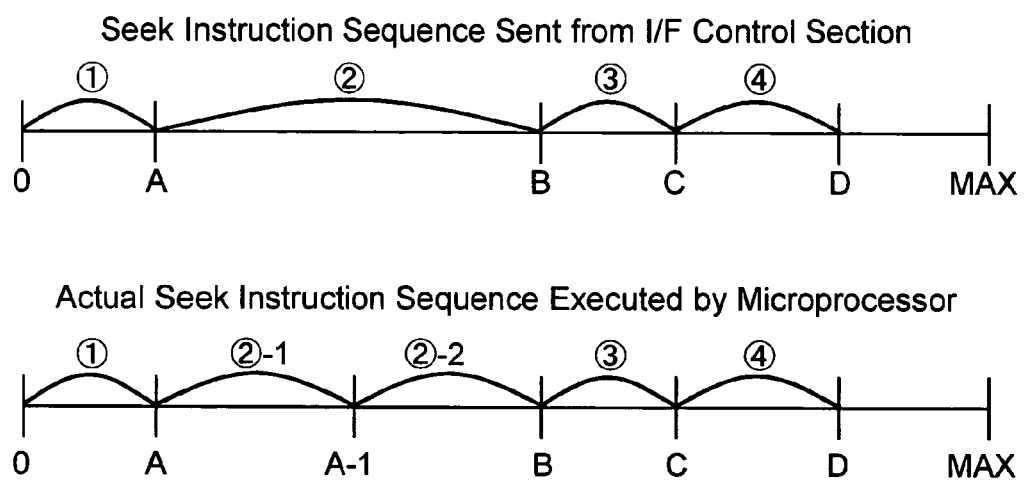
FIG. 6 is a diagram illustrating how seek instructions are executed during random access operation where a specific span seek is divided into two spans according to another example.

FIG. 6 shows another method for eliminating such seek spans as seek span ② which corresponds to characteristic frequencies of the magnetic disk drive.

The I/F control section 6 rearranges the execution order of tagged random access commands. As a result in this example, since the microprocessor 5 is given a seek instruction sequence to seek for positions A, B, C and D in this order from position 0, the successive instructions sent from the I/F control section 6 have seek spans ①, ②, ③, and ④ respectively. If the seek span or moving distance ② from position A to position B corresponds to a characteristic frequency of the magnetic disk drive and would cause larger operation noise and residual vibration, the microprocessor 5 divides the A-to-B seek instruction into two operations. Therefore, positions A, A1, B, C, and D are actually sought from the position 0 in this order by the seek instructions executed by the microprocessor. In this case, seek spans ①, ②-1, ②-2, ③ and ④ occur in this order. Since none of these seek spans equal the seek span ② which corresponds to a characteristic frequency of the magnetic disk drive, this seek span sequence suppresses the seek noise and mechanical residual vibration, making it possible to realize low noise and high accuracy positioning operation.

It is also possible to divide a specific seek span into n-th plural seek spans. In addition, the same result can be obtained by configuring the magnetic disk drive in such a manner that if a specific seek span occurs, a prescribed position is always sought before the target position is sought.

As described above, specific span seeks are not performed in magnetic disk drives according to embodiments of the present invention. This makes it possible to realize magnetic disk drives where noise and residual vibration are reduced during random access operation without deterioration in performance.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive which executes each instruction from an upper device to move a magnetic head from a start track to an end track on a magnetic disk, the magnetic disk drive comprising:
    a processor configured, if a seek span from the start track to the end track, according to a seeking instruction from the upper device, is equal to a preset specific length or within a preset specific length range, to divide the seeking instruction into two or more seek operations each of which seek spans are shorter than the preset specific length, and to execute the two or more seek operations, wherein the magnetic head stops at a track position between the start track and the end track when each of the seek operations is completed; and
    wherein the seek span of the preset specific length would cause a level of seek sound or residual vibration equal to or higher than a prescribed level.

2. A magnetic disk drive according to claim 1 further comprising a carrier configured to move the magnetic head from the start track to the end position in accordance with the two or more operations.

3. A magnetic disk drive which executes each instruction from an upper device to move a magnetic head from a start track to an end track on a magnetic disk, the magnetic disk drive comprising:
    a processor configured, if a seek span from the start track to the end track, according to a seeking instruction from the upper device, is equal to a preset specific length or within a preset specific length range, to divide the seeking instruction into two or more seek operations of a first seek operation and a second seek operation, each of which seek spans are shorter than the preset specific length, and to execute the first and second seek operations wherein the magnetic head stops at a track positioned between the start track and the end track when each of the seek operations is completed; and
    wherein the seek span of the preset specific length would cause a level of seek sound or residual vibration equal to or higher than a prescribed level.

4. A magnetic disk drive according to claim 3 further comprising a carrier configured to move the magnetic head from the start track to the end position in accordance with the first and second seek operations.

* * * * *